(No Model.)

J. W. GILBERT & E. T. STARR.
GALVANIC BATTERY.

No. 281,262. Patented July 17, 1883.

WITNESSES:
Wm A. Skinkle
H. W. Elmore.

INVENTORS:
John W. Gilbert,
Eli T. Starr,
By their Attorneys,
Baldwin, Hopkins & Peyton.

UNITED STATES PATENT OFFICE.

JOHN W. GILBERT AND ELI T. STARR, OF PHILADELPHIA, PENNSYLVANIA, ASSIGNORS TO THE S. S. WHITE DENTAL MANUFACTURING COMPANY, OF SAME PLACE.

GALVANIC BATTERY.

SPECIFICATION forming part of Letters Patent No. 281,262, dated July 17, 1883.

Application filed April 3, 1883. (No model.)

*To all whom it may concern:*

Be it known that we, JOHN W. GILBERT and ELI T. STARR, both of the city and county of Philadelphia, in the State of Pennsylvania, have invented certain new and useful Improvements in Galvanic Batteries, of which the following is a specification.

Our invention relates to galvanic batteries of that class which are provided with means for elevating the plates or electrodes from the battery-fluid when the battery is not in use, so as to prevent useless consumption of the battery, waste of energy, and polarization. Heretofore, however, although the electrodes or battery-plates have been elevated or raised out of the fluid when the battery is not to be used, which, to a certain extent, tends to the saving of energy and prevents its useless consumption, still we have found that merely raising the plates or electrodes out of the fluid does not relieve the battery of all waste action, because the plates upon being elevated from the fluid are exposed to the action of the air, and this corrodes them to a degree which is disadvantageous and materially aids in the wearing out of the battery, and consequently prevents it from lasting as long as it should.

The object of our invention, therefore, is not only to elevate or remove the battery-plates or electrodes from the battery-fluid when the battery is not to be used, but also to prevent the corroding or injurious action which goes on upon the surfaces of the plates when thus elevated and exposed to the action of the air. To this end we provide means not only for withdrawing the electrodes or plates from the battery-fluid, but also for immersing them in a suitable liquid or preservative medium which protects them from the injurious action of the air above noted.

The subject-matter claimed herein is particularly pointed out at the close of the specification. Some of our improvements may be used without the others.

Figure 1:
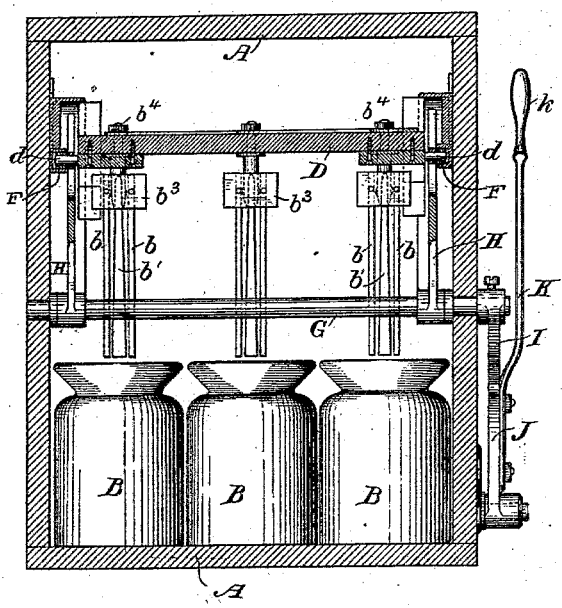
Figure 2:
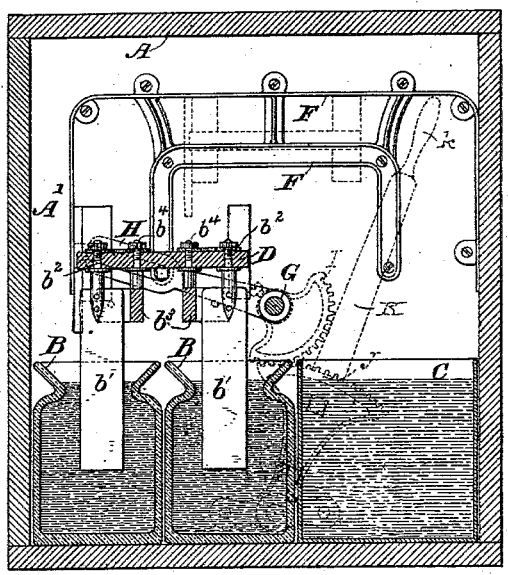
Figure 3:
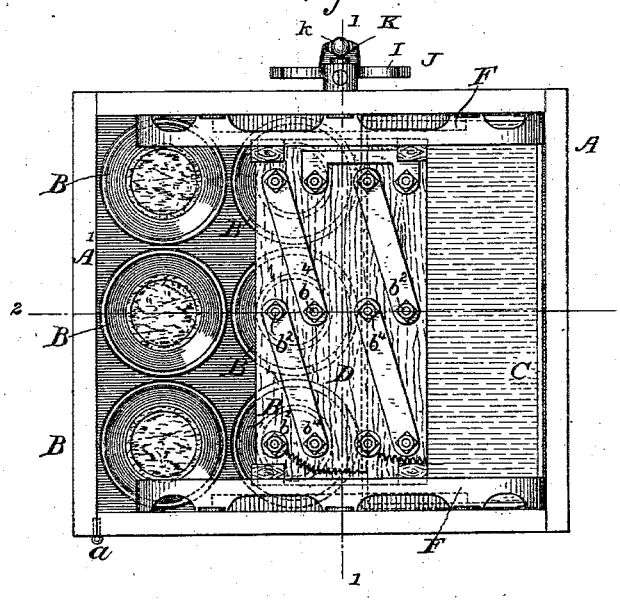

In the accompanying drawings, which illustrate our invention as embodied in the best way now known to us, Figure 1 is a vertical central transverse section through our improved apparatus, showing the electrodes or plates of the several cells of the battery as elevated preparatory to immersing them in the medium which prevents corrosive and injurious action of said plates. Fig. 2 is a similar longitudinal section through the apparatus, the section being taken through said apparatus at right angles to that of Fig. 1, while the plates or electrodes of the several cells of the battery are shown as only partially elevated or removed from the battery-fluid. Fig. 3 is a plan or top view of our improved apparatus, with the top or cover of the box or casing removed.

The box or casing A is provided to contain the several cells, vessels, or jars, B, of the galvanic battery, and in rear of said vessels or cells to contain a tank, trough, or vessel, C. The front, A', of the casing A is preferably hinged, as at $a$, so as to swing open or act as a door through which access may be readily had to the interior of said casing. The vessels or jars B contain the excitant fluid of the battery, and in this fluid, when the battery is in action, is immersed the electrodes or plates of the several cells. In the present example the electrodes of each cell of the battery consist of two plates of carbon, $b$, between which and separated from them is a zinc plate, $b'$. These plates or electrodes are suspended by a conducting connection from a non-conducting board or support, D—that is to say, the zinc plates are separately suspended from their upper ends from the board D by means of independent conducting bolts or screws $b^2$, while the carbon plates of each cell are likewise suspended from said board by a yoke, $b^3$, and bolt $b^4$, the ends of the yoke extending around upon each side of the zinc plate or its connection, and having attached thereto the upper ends of the carbon plates, one on each side of the zinc plate of the cell. In the present example the battery consists of six cells in two rows of three cells each, and the suspending connections of the electrodes or plates are electrically connected in the example shown, so as to have said cells connected up in series, so as to work for intensity.

The suspending board or support D is adjustable or movable, and we prefer the lines of movement to be such that when said board is elevated it will carry the electrodes or plates vertically up out of the fluid of the cells, then horizontally rearward by means of suitable guides, and will then descend to immerse said electrodes in the liquid, preferably contained in the tank or trough C, arranged parallel with the battery cells or vessels B, but in rear thereof in the casing or box A. This removal of the electrodes from the battery vessels or jars B is to be effected when the battery is no longer required for use, and its object is to prevent a useless continuous consumption of the power of the battery or polarization which will take place by local action or otherwise if the electrodes or plates are permitted to remain in the excitant fluid, as well during use as when the battery is not required for operation.

To simply remove the electrodes or plates from the battery-fluid would be advantageous; but disadvantages accrue by reason of the corrosive action of the air upon the plates. We have therefore made provision not only for removing the electrodes or plates from the battery-fluid, but to immerse them in another liquid or medium which will cleanse them, and also protect them from corrosive action. This liquid may be pure water contained in the tank or trough E, before mentioned; but other fluids or mediums may be used in lieu of the water to effect the same result, some of which will readily suggest themselves to those familiar with the use of galvanic batteries.

The mechanism we prefer to employ for a transfer of the plates or electrodes from the battery vessels or jars B to the trough C, and vice versa, consists of two grooved guides, F F, formed in or attached to the sides of the box or casing A, in which are fitted and are adapted to travel or move trunnions or journals $d\ d$, mounted on the carrying-board D, the said trunnions being provided with anti-friction rollers, preferably to facilitate the movement of the board D. The guide-grooves are preferably formed in suitable castings attached to the inside of the box or casing A, and consist of vertical grooves connected by a horizontal groove, the transit from the vertical to the horizontal guide-grooves being effected by curving said vertical and horizontal grooves where they connect, as clearly shown in Fig. 2. The carrying-board D is thus fitted to travel vertically and horizontally, as will be understood. In order to give the board D this vertical and horizontal movement, a rock-shaft, G, is passed transversely through the box or casing A, and near each side of said box said shaft is provided with arms H H, fixed thereon and slotted at their outer ends, the trunnions $d\ d$ of the carrying-board D passing through the slots in said arms, as clearly shown in Figs. 1 and 2.

Outside of the box A the rock-shaft G is provided with a gear-sector, I, which is adapted to mesh with a similar sector, J, pivoted at its lower end to the side of the box A, and bolted to a lever, K, the handle $k$ of which extends upward to be conveniently grasped. By moving the lever K, and consequently the sector J, the shaft G is rocked, and by the turning movements of the arms H H will carry the board D and the plates or electrodes suspended therefrom either to immerse them in the fluid of the cells or in the tank or trough C, as will be obvious. As the lever K is rocked toward the front of the box A the board D will be carried up, back, and down, so as to immerse the electrodes in the fluid of the tank C, while a movement of the lever toward the rear causes a reverse movement of the carrying-board D to immerse or plunge its electrodes or plates into the fluid of their respective cells. The slots in the arms H H compensate for the straight-line movements which the carrying-board D takes in operation. These straight-line movements are advantageous, in that it enables the plates or electrodes to be fully withdrawn vertically out of the battery-vessels, or out of the tank E, and then to be moved horizontally to carry them to the point desired.

We claim herein as of our own invention—

1. The combination, with an electrode of a battery-cell, of a tank or vessel containing a preservative liquid, and mechanism to carry said electrode back and forth between its cell and said tank.

2. The combination of the electrodes of a battery-cell, a movable support with which said electrodes are connected, a guide for said movable support, a vessel containing a preservative medium, and mechanism for moving said support in said guides, so as to immerse the electrodes either in the fluid of the cell or in the preservative medium of said vessel.

3. The combination of the electrodes of a battery-cell, a movable carrying-support, from which said electrodes are suspended, and guides for said support, whereby the electrodes may be raised out of the fluid of the battery-cell and transferred to another point, substantially as described.

4. The combination of the electrodes of a battery-cell, a movable support therefor, guides for said support, a rock-shaft carrying arms by which to shift said movable support, and a handle to rock said shaft in its bearings.

5. The combination of the electrodes of a battery-cell, a movable support therefor, guides for said support, a rock-shaft carrying slotted arms connected with said movable support, a toothed sector mounted on said shaft, and another sector meshing with said rock-shaft sector, and provided with a handle by which to shift the movable support and electrodes carried thereby.

6. The combination, with a movable support carrying the electrodes of a battery-cell, of shifting mechanism by which to move said support, and guide-grooves to control the direction of movement of said support, consisting of vertical and horizontal portions, whereby the support is moved vertically, then horizontally, and again vertically in its shifting movement, substantially as described.

In testimony whereof we have hereunto subscribed our names this 31st day of March, A. D. 1883.

JOHN W. GILBERT.
ELI T. STARR.

Witnesses:
W. R. POTTER,
A. P. ROOT.